United States Patent
Courtney et al.

(10) Patent No.: US 11,308,194 B2
(45) Date of Patent: Apr. 19, 2022

(54) MONITORING DEVICE COMPONENTS USING DISTRIBUTED LEDGER

(71) Applicant: Seagate Technology LLC, Cupertino, CA (US)

(72) Inventors: Timothy J. Courtney, Longmont, CO (US); David R. Kaiser, St. Paul, MN (US); Anthony R. Duran, Longmont, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 356 days.

(21) Appl. No.: 16/176,365

(22) Filed: Oct. 31, 2018

(65) Prior Publication Data

US 2020/0134163 A1    Apr. 30, 2020

(51) Int. Cl.
    *G06F 21/44*    (2013.01)
    *H04L 9/32*     (2006.01)

(52) U.S. Cl.
    CPC ............ *G06F 21/44* (2013.01); *H04L 9/3236* (2013.01); *H04L 9/3247* (2013.01); *H04L 9/3297* (2013.01); *G06F 2221/2101* (2013.01); *G06F 2221/2129* (2013.01); *H04L 2209/38* (2013.01)

(58) Field of Classification Search
    CPC ... H04L 9/3297; H04L 9/3236; H04L 9/3247; H04L 9/3239; H04L 63/00; H04L 2209/38; G06F 21/57; G06F 21/44; G06F 2221/2101; G06F 2221/2129
    USPC .............................. 726/2; 713/181
    See application file for complete search history.

(56) References Cited

U.S. PATENT DOCUMENTS

| | | | |
|---|---|---|---|
| 7,765,217 B2 | 7/2010 | Yamakawa | |
| 8,099,365 B2* | 1/2012 | Bhambri | G06Q 30/0601 705/59 |
| 8,108,923 B1* | 1/2012 | Satish | G06F 21/552 726/11 |
| 8,161,527 B2* | 4/2012 | Curren | G06F 21/6227 726/2 |

(Continued)

FOREIGN PATENT DOCUMENTS

EP    3451257 A1    3/2019

OTHER PUBLICATIONS

Author Unknown, "Implement your first IoT and Blockchain project," IBM, [retrieved on Aug. 22, 2017] 6 pages, retrieved from: https://www.ibm.com/internet-of-things/platform/private-blockchain/.

(Continued)

*Primary Examiner* — Amare F Tabor
(74) *Attorney, Agent, or Firm* — Holzer Patel Drennan

(57) ABSTRACT

The technology disclosed herein provides a method to control the resources used in a device. An implementation of such a method includes generating a device configuration ledger block based on initial assembly of components of a storage device, storing the device configuration ledger block on a node of a distributed ledger, detecting an activation of the device; in response to detecting the activation of the device, generating a current distributed ledger block based on current assembly of components of the storage device, comparing the current distributed ledger block with the device configuration ledger block, and in response to determining that the current distributed ledger block does not match with the device configuration ledger block disabling the operation of the device.

20 Claims, 7 Drawing Sheets

(56) References Cited

U.S. PATENT DOCUMENTS

| | | | | |
|---|---|---|---|---|
| 8,516,552 | B2* | 8/2013 | Raleigh | H04L 63/04 |
| | | | | 726/2 |
| 8,788,810 | B2* | 7/2014 | Zhang | H04L 9/0841 |
| | | | | 713/156 |
| 8,843,997 | B1* | 9/2014 | Hare | H04L 63/0815 |
| | | | | 726/3 |
| 8,984,293 | B2* | 3/2015 | Layson | G06F 21/121 |
| | | | | 713/182 |
| 9,182,944 | B2 | 11/2015 | Du | |
| 9,373,219 | B2* | 6/2016 | Bigelow, Jr | G07F 17/3241 |
| 9,424,023 | B2 | 8/2016 | Jansson et al. | |
| 9,858,781 | B1 | 1/2018 | Campero | |
| 9,960,920 | B2* | 5/2018 | Cuende | H04L 9/3236 |
| 10,291,395 | B1* | 5/2019 | Nenov | H04L 63/0428 |
| 10,320,566 | B2 | 6/2019 | Banerjee | |
| 10,326,749 | B2 | 6/2019 | Linton | |
| 10,333,705 | B2 | 6/2019 | Smith | |
| 10,361,869 | B2 | 7/2019 | Gorman | |
| 10,367,645 | B2 | 7/2019 | Dechu | |
| 10,489,597 | B2 | 11/2019 | Safford | |
| 10,581,847 | B1 | 3/2020 | Sun | |
| 10,754,323 | B2 | 8/2020 | Freer et al. | |
| 10,755,230 | B2 | 8/2020 | Mehring et al. | |
| 10,855,758 | B1 | 12/2020 | O'Connell | |
| 2006/0095923 | A1 | 5/2006 | Novack et al. | |
| 2010/0293345 | A1 | 11/2010 | Sonnier et al. | |
| 2013/0291001 | A1 | 10/2013 | Besehanic et al. | |
| 2015/0186760 | A1 | 7/2015 | Albrecht | |
| 2016/0098723 | A1 | 4/2016 | Feeney | |
| 2016/0098730 | A1 | 4/2016 | Feeny | |
| 2016/0275461 | A1 | 9/2016 | Sprague | |
| 2016/0299918 | A1 | 10/2016 | Ford | |
| 2016/0344550 | A1* | 11/2016 | Anton | G06F 21/31 |
| 2016/0379212 | A1 | 12/2016 | Bowman | |
| 2017/0005804 | A1 | 1/2017 | Zinder | |
| 2017/0031676 | A1 | 2/2017 | Cecchetti | |
| 2017/0134161 | A1 | 5/2017 | Goeringer et al. | |
| 2017/0134162 | A1 | 5/2017 | Code et al. | |
| 2017/0262862 | A1 | 9/2017 | Aljawhari | |
| 2017/0264428 | A1 | 9/2017 | Seger, II | |
| 2017/0352027 | A1 | 12/2017 | Zhang | |
| 2018/0019867 | A1 | 1/2018 | Davis | |
| 2018/0121635 | A1* | 5/2018 | Tormasov | H04L 9/3297 |
| 2018/0131765 | A1 | 5/2018 | Puleston et al. | |
| 2018/0157825 | A1 | 6/2018 | Eksten | |
| 2018/0176228 | A1 | 6/2018 | He | |
| 2018/0191714 | A1 | 7/2018 | Jentzsch | |
| 2018/0198604 | A1 | 7/2018 | Hayton | |
| 2018/0219676 | A1 | 8/2018 | Mattingly et al. | |
| 2018/0248701 | A1 | 8/2018 | Johnson | |
| 2018/0260212 | A1 | 9/2018 | Wisnovosky | |
| 2018/0268386 | A1 | 9/2018 | Wack | |
| 2018/0285839 | A1 | 10/2018 | Yang | |
| 2018/0287797 | A1 | 10/2018 | Banerjee | |
| 2018/0375750 | A1 | 12/2018 | Moeller | |
| 2019/0066068 | A1 | 2/2019 | Mitchell | |
| 2019/0114334 | A1 | 4/2019 | Gunther | |
| 2019/0158291 | A1 | 5/2019 | Ignatchenko | |
| 2019/0158470 | A1 | 5/2019 | Wright | |
| 2019/0166132 | A1 | 5/2019 | He | |
| 2019/0182053 | A1 | 6/2019 | Varpiola | |
| 2019/0207957 | A1* | 7/2019 | Espinosa | H04W 12/009 |
| 2019/0245694 | A1 | 8/2019 | Banerjee | |
| 2019/0319808 | A1 | 10/2019 | Fallah | |
| 2019/0333059 | A1 | 10/2019 | Fallah | |
| 2019/0349733 | A1 | 11/2019 | Nolan | |
| 2019/0372755 | A1* | 12/2019 | Tadie | G06Q 20/382 |
| 2019/0372772 | A1* | 12/2019 | Novotny | H04L 9/3239 |

OTHER PUBLICATIONS

O'Connor, Chris, "What blockchain means for you, and the Internet of Things," IBM, Feb. 10, 2017, [retrieved on Aug. 22, 2017] 9 pages, retrieved from: https://www.ibm.com/blogs/internet-of-things/watson-iot-blockchain/.

Reichert, Corrine, "Telstra explores blockchain, biometrics to secure smart home IoT devices," ZDNet Sep. 22, 2016 [retrieved on Aug. 22, 2017] 11 pages, retrieved from: http://www.zdnet.com/article/telstra-explores-blockchain-biometrics-to-secure-smart-home-iot-devices/.

Abeyratne et al.; Blockchain Ready Manufacturing Supply Chain Using Distributed Ledger; 2016; retrieved from the Internet https://www.researchgate.net/profile/Radmehr_Monfared; pp. 1-12, as printed. (Year: 2016).

No stated author; MAXXeGUARD Shredder; 2016; retrieved from the Internet https://dtasiagroup.com/maxxeguard-the-high-security-shredder/; pp. 1-6, as printed. (Year: 2016).

No stated author; Hitachi Command Suite Audit Log Reference Guide; 2014; Retrieved from the Internet <URL: https://support.hitachivantara.com/download/epcra/hc2132.pdf>; pp. 1-480, as printed (Year: 2014).

Park Jaemin et al, "TM-Coin: Trustworthy management of TCB measurements in IoT", 2017 IEEE International Conference on Pervasive Computing and Communications Workshops (PERCOM Workshops), IEEE, Mar. 13, 2017 (Mar. 13, 2017), p. 654-659.

International Search Report issued for PCT Application PCT/US2019/059219, completed Feb. 4, 2020.

* cited by examiner

MONITORING DEVICE COMPONENTS USING DISTRIBUTED LEDGER

BACKGROUND

It is difficult to authenticate various information about components of a device. For example, a given storage device may be manufactured with a given configuration of components or resources, such as a power supply, various storage drives, bus components, etc. The specific components used in storage device and its specific configuration are generally important to the proper functioning of that given storage device, its capabilities, and to various warranties associated with the device performance. As a result, it is useful to know if and when any user or third party changes the configuration or replaces one or more of the storage device's components.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a technology disclosed herein provides a method to control the resources used in a device. An implementation of such a method includes generating a device configuration ledger block based on initial assembly of components of a storage device, storing the device configuration ledger block on a node of a distributed ledger, detecting an activation of the device; in response to detecting the activation of the device, generating a current distributed ledger block based on current assembly of components of the storage device, comparing the current distributed ledger block with the device configuration ledger block, and in response to determining that the current distributed ledger block does not match with the device configuration ledger block disabling the operation of the device.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Implementations described herein provide system for using distributed ledger to monitor trusted components of devices. In one implementation, the device component monitoring system disclosed herein provides a method to control resources that are used in large storage systems by using distributed ledgers and secure binding technologies to prevent counterfeiting and gray market activities.

In one implementation, the hash generator is configured to automatically generates a hash based on configuration of components of a device including the listing of device components and various attributes of the device components. Specifically, in one implementation, the hash generator in a device generates a hash based on configuration of device components at the time of manufacturing of the device. For example, such a device may be a storage device such as a disc drive or a collection of disc drives. The hash may also include other device metadata including the time when the hash was generated, the identification of all components or parts of the device such as a motherboard, drives, memories, power supplies, communications buses, one or more microprocessors, etc.

For example, during manufacturing and initial provisioning of a device such as a storage system, a hash may be generated based on information about all components of the storage system. Subsequently, a distributed ledger node may be generated based on the hash and a digital signature of the storage system. Such distributed ledger node may be stored on a distributed ledger. In one implementation, a copy of the distributed ledger may be stored in the memory of the storage system. Alternatively, the distributed ledger may be stored on a network such as the Internet, which may be accessible to other third parties for independent verification.

An example of the distributed ledger is blockchain. Specifically, a blockchain is a decentralized and distributed digital ledger that is used to record transactions across many computers so that the record cannot be altered retroactively without the alteration of all subsequent blocks and the collusion of the network. This allows the participants to verify and audit transactions inexpensively. Thus, the distributed ledger provides a rich documentation and authentication about various attributes regarding components of devices.

Figure 1:
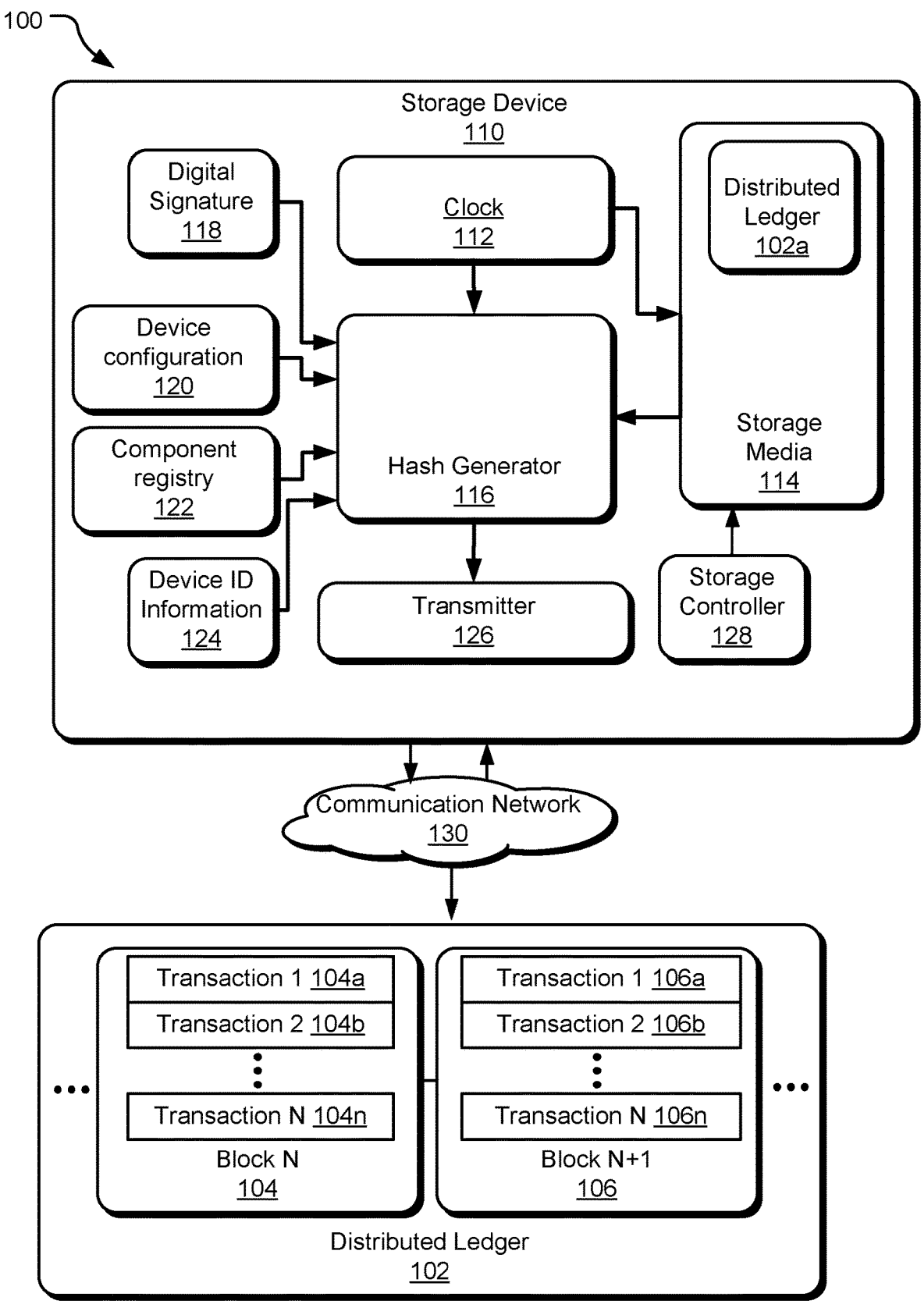
FIG. 1 illustrates an example block diagram of a device component monitoring system using an example distributed ledger.

FIG. 1 illustrates an example block diagram 100 of a system using an example distributed ledger 102 to monitor configuration and component registry of a storage device 110. Specifically, FIG. 1 illustrates the block diagram 100 of a storage device 110 as it generates stores a device hash with the distributed ledger 102. The distributed ledger 102 is utilized to ensure the integrity of the configuration and the components of storage device 110. The distributed ledger 102 stores an immutable history of configuration of and component registry for the storage device 110.

The distributed ledger 102 documents various transactions involving configuration of the storage device 110 upon its manufacture and at various other stages during the use of the storage device 110. In FIG. 1, the distributed ledger 102 is a blockchain, but it should be understood that the distributed ledger 102 may configured in a different format, such as a directed acyclic graph, a chain of transactions, etc. In the illustrated implementation, the distributed ledger 102 includes a number of blocks that include a number of validated transactions related to the storage device 110, each of these transactions may represent activation of the storage device 110, change in configuration of the storage device 110, removal and/or change of components of the storage device 110, etc. A block N 104 includes transaction 1 to transaction N and a block N+1 106 includes transaction 1 to transaction N. The blocks (e.g., the block N 104 and the block N+1 106) may include other data and metadata, such a previous hash, a nonce, a Merkle root, date, time node software version, etc.

The distributed ledger 102 is supported by a number of different "nodes." Nodes are computer systems executing processor executable instructions for supporting the distributed ledger 102. In some example implementations, nodes may be implemented in various types. For example, a full ledger node is a node that stores a substantially complete copy of the distributed ledger 102. A validation node is a node that may validate and approve transactions and/or blocks for inclusion in the distributed ledger 102. A contributor node is a node that contributes transactions for validation on the distributed ledger 102. A consumer node is a node that may consume and verify transactions on the distributed ledger 102. It should be understood that other types of nodes are contemplated.

The distributed ledger 102 may be implemented as a private (permissioned) ledger, a hybrid private/public ledger, or a fully public ledger. A private ledger is a ledger where each node supporting the ledger is authenticated or authorized to use the ledger. Furthermore, a private ledger may not be publicly visible or accessible by some nodes or outside parties. In a public distributed ledger, the full distributed ledger 102 is distributed publicly to many nodes and is accessible to all nodes in the network. Each node supporting the ledger includes a cryptographic identity, which may comprise a public/private key pair.

Different types of storage device transactions may be transmitted to, approved by, and stored in the distributed ledger 102. A storage device transaction includes information that attests to authenticity, integrity, of the configuration the storage device 110 and a registry of its components. Storage device transactions sent to the distributed ledger 102 may include information such as how the components are configured on the mother board of the storage device 110, the identification numbers of the various components of the storage device 100, digital certificates (e.g., keys), etc.

In FIG. 1, the storage device 110 includes a device clock 112 that generates a clock time-stamp that may be stored as part of hash by the hash generator 112 along with other information about the configuration of the storage device 110. A storage media 114 may be used to store the various data, including a device configuration 120, a component registry 122, etc. In one implementation, the storage media 114 may be a magnetic media, such as a conventional media recording (CMR) disc drive, a shingled media recording (SMR) disc drive, etc. In one implementation, a copy of the distributed ledger 102 may be stored as a distributed ledger 102*a*.

The storage device 110 also includes device identification information 124 that stores identification information about the storage device 110, such as a serial number of the storage device 110, a network identification number of the storage device 110, information identifying the owner of the storage device 110, etc. Alternatively, the device identification information 124 also stores an internet protocol (IP) address of the storage device 110, a media access control (MAC) address of the storage device 110, a service set identifier (SSID) of the storage device 110, an international mobile equipment identity (IMEI) of the storage device 110, a software element identification (SEID) of the storage device 110, etc. In one implementation, such device identification information 124 may be used together with device configuration 120, the component registry 122, a digital signature 118 of the storage device 110, etc., to generate a hash value that stored on a node of the distribute ledger 102.

The storage device 110 also includes a hash generator 116 that is configured to generate a hash of the combination of the device configuration 120 and the component registry 122 along with various other information at the time of the manufacturing of the storage device 110. The hash generator 116 may be implemented as processor executable instructions stored in memory of a computing machine (e.g., the storage device 110 includes a memory storing instructions for the hash generator 116) and executed by a processor located on the storage device 110. The device configuration 120 may include the schematics of the storage device 110 whereas the component registry 122 may include a registry of the storage components of the storage device 110, including identification information of each of the components such as a power supply, one or more random access memory (RAM), communication bus, etc., of the storage device 110.

The hash generator 116 may generate hash values (also referred to as hash codes) of the device configuration 120 and the component registry 122 using a hash function. In one implementation, the hash function used by the hash generator 116 may be a cryptographic hash function that allows one to easily verify that a given input data maps to a given hash value. Thus, the hash value generated by hash generator 116 may be mapped to specific combination of the device configuration 120 and the component registry 122. However, in such a case, if the input value of the combination of the device configuration 120 and the component registry 122 is not known, a user is unable to reconstruct it by knowing the hash value output by the hash generator 116. Alternatively, the hash function may be collision-resistant in that the hash value generated by such a hash function may not be generated by any input data other than the combination of the device configuration 120 and the component registry 122 used to generate it.

In one implementation, the device configuration 120 also includes the bill of material (BOM) from the manufacturing factory or the manufacturing entity that manufactures the device 100. Furthermore, as the device 100 is being manufactured, the hash generator 116 may not have the capability to generate the hash value and therefore, the initial hash value that is used on the blockchain node may be generated by an external processor at the manufacturing facility and a distributed ledger block generated using such externally generated hash may be stored on the storage media 114 when the device 100 is shipped. Furthermore, in one implementation, newly generated blocks may also be added to the distributed ledger 114 in response to one or more critical or catastrophic events affecting the device 100, such as a device failure, etc.

In an alternative implementation, the media generator 116 generates the hash value using a combination of the values received from various other components of the storage device 110 including the combination of the device configuration 120 and the component registry 122. Thus, for example, the hash generator 116 uses the GPS location received from the GPS module 120, the time-stamp received from the clock 122, together with the combination of the device configuration 120 and the component registry 122 to generate the hash value.

The hash generator 116 communicates with a transmitter 126 to communicate the hash value to the distributed ledger 102. In one implementation, the hash generator 116 communicates the hash values as they are generated. Alternatively, the hah generator 116 may accumulate a predetermined number of hash values and communicate the accumulated chunks of the hash values to the distributed ledger 102 at predetermined time intervals. If the hash generator 116 is configured to generate headers using various parameters of the storage device 110 related to the combination of the device configuration 120 and the component registry 122, such headers are also communicated with the hash values to the distributed ledger 102.

The distributed ledger 102 stores the hash values and/or the related header values as transactions on the blocks 104, 106 of the distributed ledger 102. In implementation, the transactions 104a, 104b, 104n, are signed by a private key of the ledger node of the storage device 110. The other nodes supporting the distributed ledger 102 may verify the transactions based on a public key associated with the private key of the storage device 110. Alternatively, the transactions 104a, 104b, 104n may also include the public key associated with the private key of the storage device 110.

Because the hash values of the combination of the device configuration 120 and the component registry 122 are recorded to the distributed ledger, the authenticity of the combination of the device configuration 120 and the component registry 122 may be verified by third parties using the public key associated with the private key of the storage device 110. Thus, over the life of the storage device, hash values may be generated using current value of combination of the device configuration 120 and the component registry 122 and compared to the hash value of such combination generated at the time of the manufacturing or provisioning of the storage device 110. If such current hash does not match the original hash then it can be determined that there has been a change in at least one of the device configuration 120 and the component registry 122.

Figure 2:
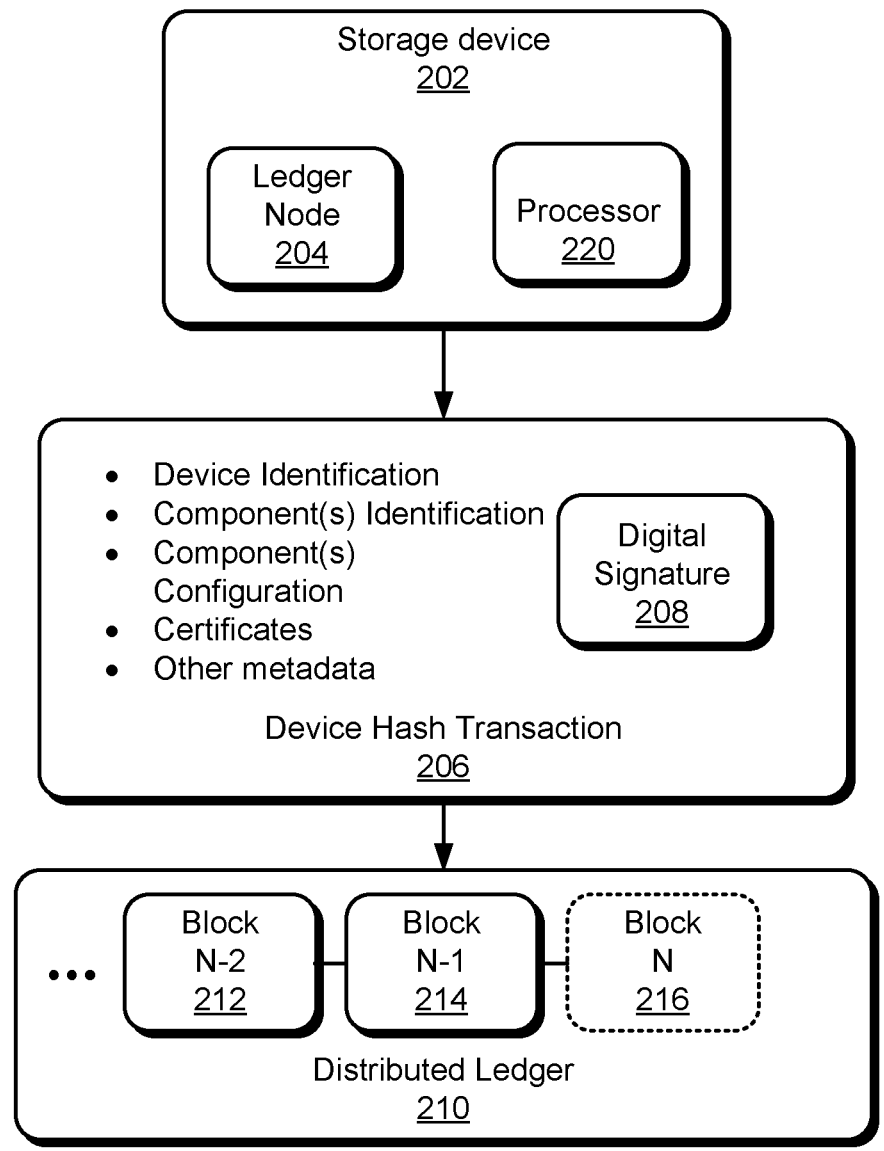
FIG. 2 illustrates a block diagram of an example hash value transaction being recorded to an example distributed ledger.

FIG. 2 illustrates a block diagram 200 of an example hash value transaction being recorded to an example distributed ledger. The block diagram 200 includes a storage device 202 executing a ledger node 204. The storage device 202 is illustrated as executing the storage node itself using a processor 220 located on the storage device 202. Alternatively, a host connected to the storage device 202 and separate from it may also be used to execute the ledger node 204.

The ledger node 204 may be implemented as processor executable instructions stored in memory of the storage device 202 (e.g., the storage device 202 includes a memory storing instructions for the ledger node 204) and executed by the processor 220 of the storage device 202. The ledger node 204 is configured to consume transactions from the distributed ledger 310 and transmit transactions to the distributed ledger 210. In some example implementations, the ledger node 204 verifies transactions on the distributed ledger 210. Also, in some example implementations, the ledger node 204 validates and approves transactions and/or blocks for inclusion in the distributed ledger 210. Furthermore, in some example implementations, the ledger node 204 stores a full or substantially full copy of the distributed ledger 210. The ledger node 204 is communicatively connected to the distributed ledger 210 (e.g., other nodes of the ledger) via a communication network (not shown). The communication network may include wired and/or wireless networks and include various communication network components for facilitating communications and transactions between nodes and devices.

In FIG. 2, the ledger node 204 of the storage device 202 is transmitting a transaction 206 (hereinafter the "device configuration transaction 206") to the distributed ledger 210. The device configuration transaction 206 includes, for example, without limitation, storage device identification (e.g., serial number or key), configuration information about the storage device, registry of components of the storage device, and other metadata. The storage device identification may be a serial number of the storage device 202. The storage device identification may also include a public key component of a public private key pair associated with the identity of the storage device 202 or the ledger node 204.

The device configuration transaction 206 further includes a digital signature 208, which signs the device configuration transaction 206. In some example implementation, the device configuration transaction 206 is signed by the private key of the transaction originator (e.g., the ledger node 204 of the storage device 202). As such, the digital signature 208 is used to verify that the device configuration hash was transmitted from an authorized entity (e.g., based on the public key associated with the private key).

The distributed ledger 210, which is supported by the ledger node 204 and other nodes not pictured in FIG. 2, includes a plurality of blocks, each with a number of transactions. The distributed ledger 210 includes a block N−1 212 and a block N−2 214. The block N−1 214 is the most recent block added to the distributed ledger 210. In other words, the block N−1 214 is the most recently validated and approved for the distributed ledger 210. The blocks are "chained" because each subsequent block includes a hash of the previous block. For example, the block N−1 214 includes a hash of the previous block, the block N−2 212, etc. A block N 216 is the next block in the distributed ledger 210. The block N has not been validated yet. The device configuration hash transaction 206, if approved/validated, may be included in the block N once it is included in the distributed ledger 210.

Figure 3:
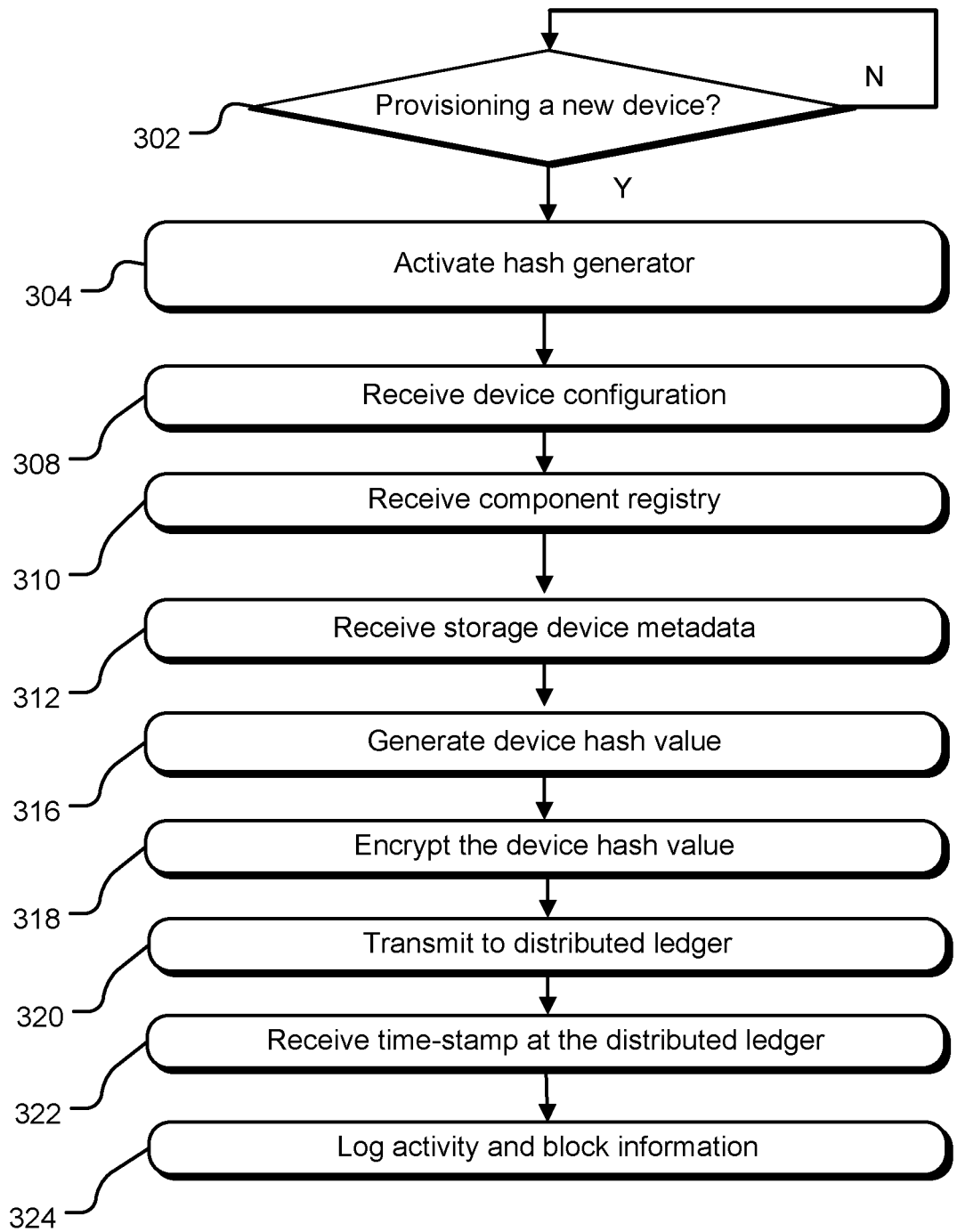
FIG. 3 illustrates an example flowchart illustrating configuring a distributed ledger note to monitor components of a device at a manufacturing stage.

FIG. 3 illustrates example operations 300 for utilizing an example distributed ledger described herein to store device configuration hash on a distributed ledger. One or more of the operations 300 may be implemented using a processor on a storage device (such as the storage device 110 illustrated in FIG. 1). An operation 302 determines provisioning of a new storage device. For example, when the device manufacturing is complete a signal may be communicated to the processor to notify the initiation of a storage device hash transaction. If so, an operation 304 activates a hash generator. The hash generator may be software implemented or firmware implemented. For example, the hash generator (such as the hash generator 116 disclosed in FIG. 1).

An operation 308 receives the location of the storage. For example, operation 308 may receive the configuration of the storage device for which the device configuration hash is to be generated. An operation 310 may receive component registry of the storage device. Such component registry may include listing of all components of the storage device, their configuration on mother board of the storage device, and their identifications. An operation 312 receives other storage device metadata, for example, the storage device metadata may include the serial number, network identification, an IP address, an IMEI, and SEID, an SSID, a MAC address, etc., and other metadata of the storage device.

An operation 316 generates a hash value of the media stored on the storage media. In one implementation, the operation 316 generates a hash value using the device configuration, the device component registry, and one or more of the other storage device metadata. In one implementation, the operation 316 may use a cryptographic hash function that allows one to easily verify that a given input data maps to a given hash value. Alternatively, the operation 316 may use a hash function that is collision-resistant.

In one implementation, the operation 316 uses the information received at one or more of the receiving operations 308-312 in generating the hash value. Alternatively, the information received at one or more of the receiving operations 308-314 may be used to generate a header that is separate from the hash value. An operation 318 encrypts the hash value and/or the combination of the hash value and the header. The encrypted output of operation 318 is communicated to a distributed ledger at operation 320. An operation 322 receives time-stamp of when the encrypted output of operation 318 is received at the distributed ledger. Subsequently, an operation 324 logs the information about the hash generation and transmission activity, together with the block on the distributed ledger where the hash value may be stored, and the time-stamp when the encrypted output of operation 318 is received at the distributed ledger. Logging the time-stamp when the hash value together with the metadata about the storage device configuration allows for independent verification of the storage device configuration and the component registry at the time of the manufacturing of the storage device.

Figure 4:
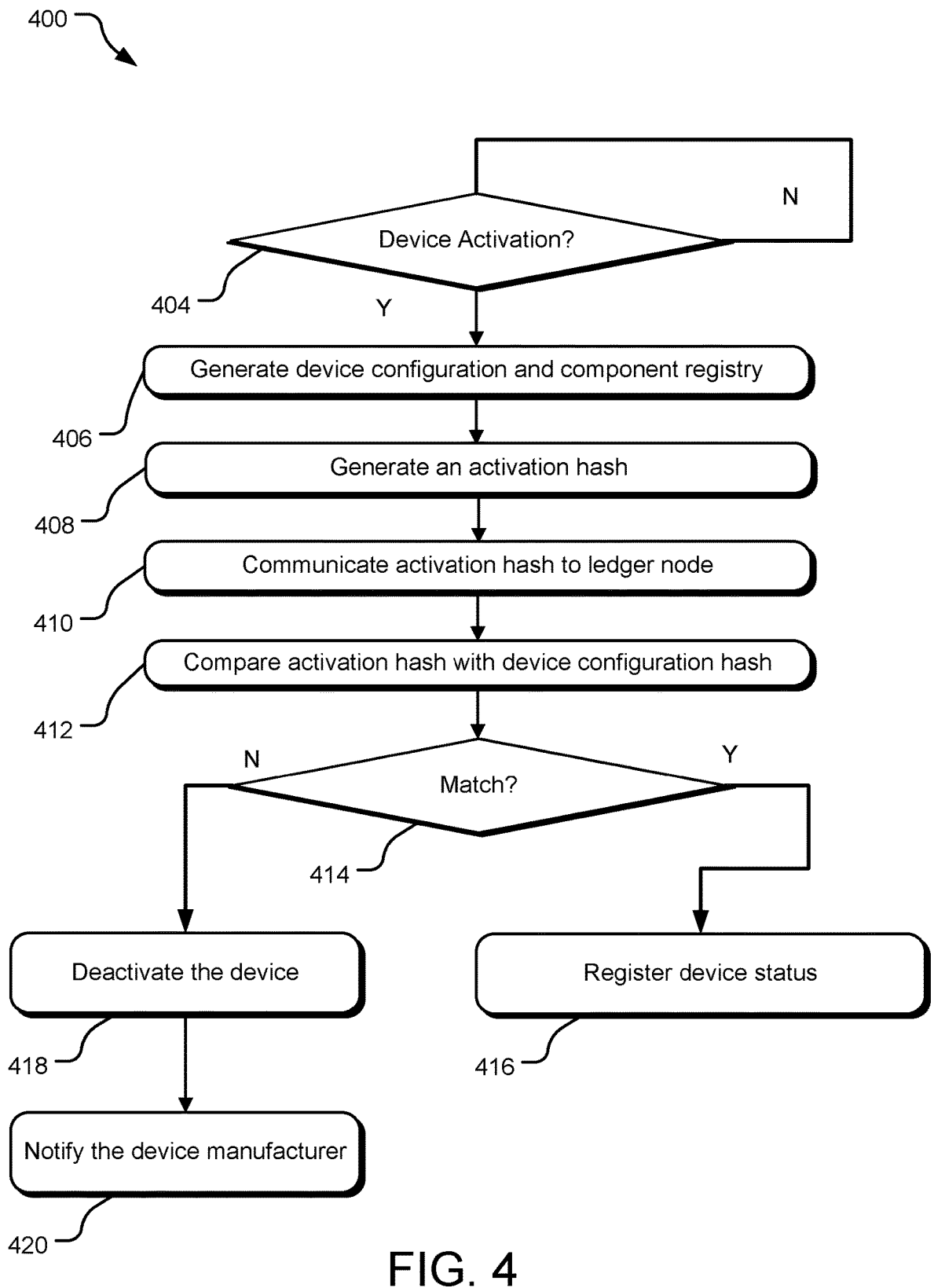
FIG. 4 illustrates an alternative example flowchart illustrating ensuring device configuration using a distributed ledger in response to device activation.

FIG. 4 illustrates an alternative example flowchart 400 illustrating ensuring device configuration using a distributed ledger in response to device activation. One or more of these operations may be implemented on the storage device. An operation 404 determines if the device has been activated. For example, any time the storage device has been turned on, a signal may be communicated to a module in the storage device to notify it of the device activation. In response to determining that the storage device has been activated, an operation 406 generate current device configuration and device component registry. An operation 408 generates an activation hash based on the current device configuration and device component registry. In one implementation, other metadata may also be used. Specifically, the other metadata is similar to the metadata used when generating the device configuration hash at the time of the manufacturing of the storage device.

Subsequently, an operation 410 communicates the activation hash to a ledger node on a distributed ledger (such as the distributed ledger 102 disclosed in FIG. 1). In one implementation, such ledger node may be stored on a media on the storage device and as a result, the activation hash may be communicated to a processor on the storage device that can compare the activation hash with the device configuration hash. Alternatively, if the ledger node storing the device configuration hash is stored on a remote server, the storage device may communicate the activation hash to such remote server. An operation 412 compares the activation hash with the device configuration hash. If there the activation hash matches the device configuration hash at a determining operation 414, an operation 416 registers the status of the device and the device may operate normally after that. If, the activation hash does not match the device configuration hash, an operation 418 deactivates the storage device and subsequently an operation 420 notifies the manufacturer of the device about the potential change in the device configuration and/or device components.

Figure 5:
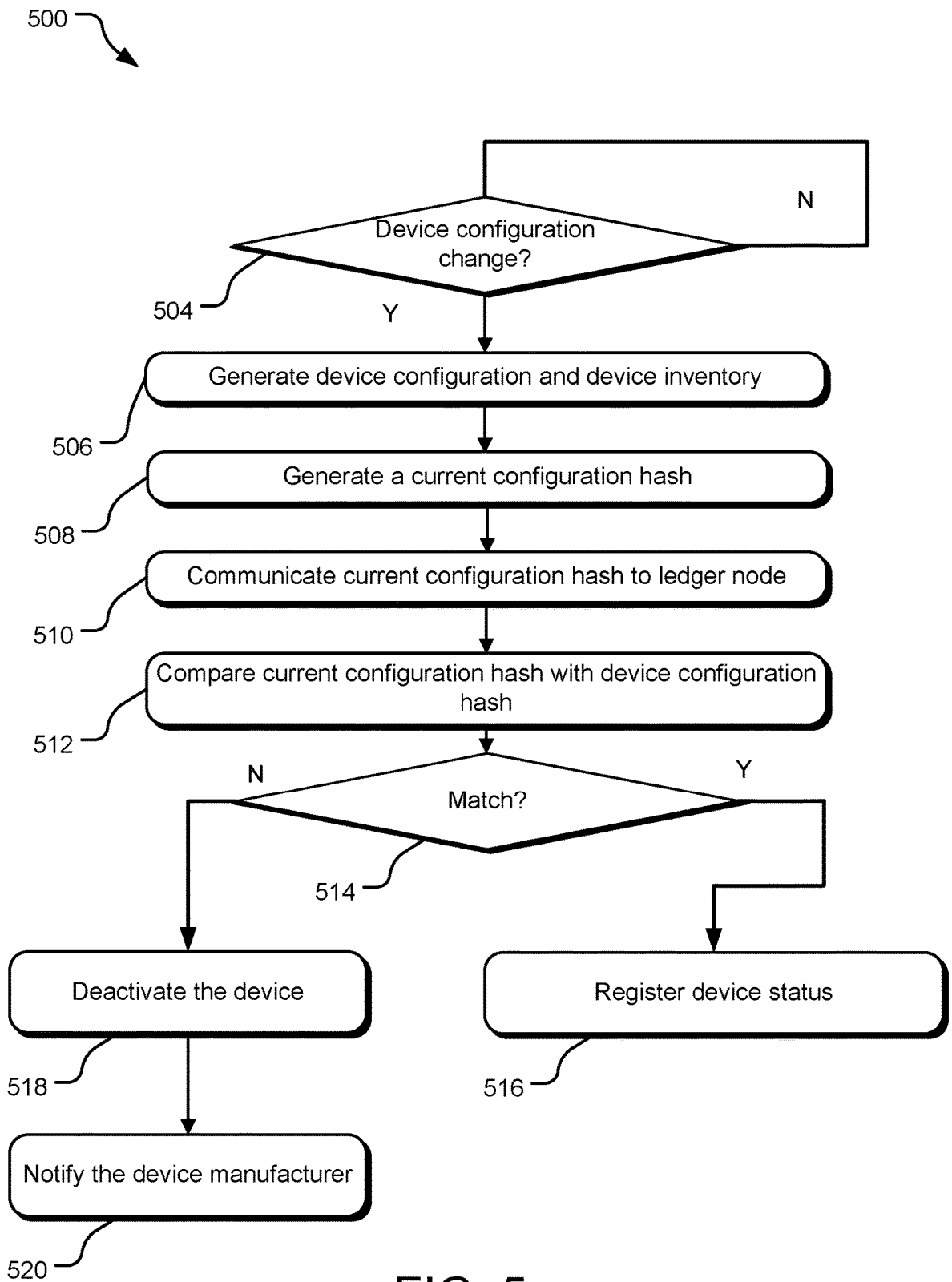
FIG. 5 illustrates another alternative example flowchart illustrating ensuring device configuration using a distributed ledger in response to change of a device configuration.

FIG. 5 illustrates another alternative example flowchart 500 illustrating ensuring device configuration using a distributed ledger in response to change of a device configuration. One or more of these operations may be implemented on the storage device. An operation 504 determines if the device configuration has changed. For example, any time there is any change made to the configuration of the storage device, such as an addition of a new storage drive, a removal of a component, etc., a signal may be communicated to a module in the storage device to notify it of the device configuration audit change. In one implementation, the device configuration change may be a result of a periodic audit routine performed at the device. For example, on a periodic basis, an audit module of the storage device may perform an audit of the storage device configuration to determine if there is any change.

In response to determining that the storage device configuration may have changed, an operation 506 generates current device configuration and device component registry. An operation 508 generates a current configuration hash based on the current device configuration and device component registry. Subsequently, an operation 510 communicates the current configuration hash to a ledger node on a distributed ledger (such as the distributed ledger 102 disclosed in FIG. 1). In one implementation, such ledger node may be stored on a media on the storage device and as a result, the activation hash may be communicated to a processor on the storage device that can compare the current configuration hash with the device configuration hash. Alternatively, if the ledger node storing the device configuration hash is stored on a remote server, the storage device may communicate the activation hash to such remote server.

An operation 512 compares the current communication hash with the device configuration hash. If there the current communication hash matches the device configuration hash at a determining operation 514, an operation 516 registers the status of the device and the device may operate normally after that. If, the current communication hash does not match the device configuration hash, an operation 518 deactivates the storage device and subsequently an operation 520 notifies the manufacturer of the device about the potential change in the device configuration and/or device components.

Figure 6:
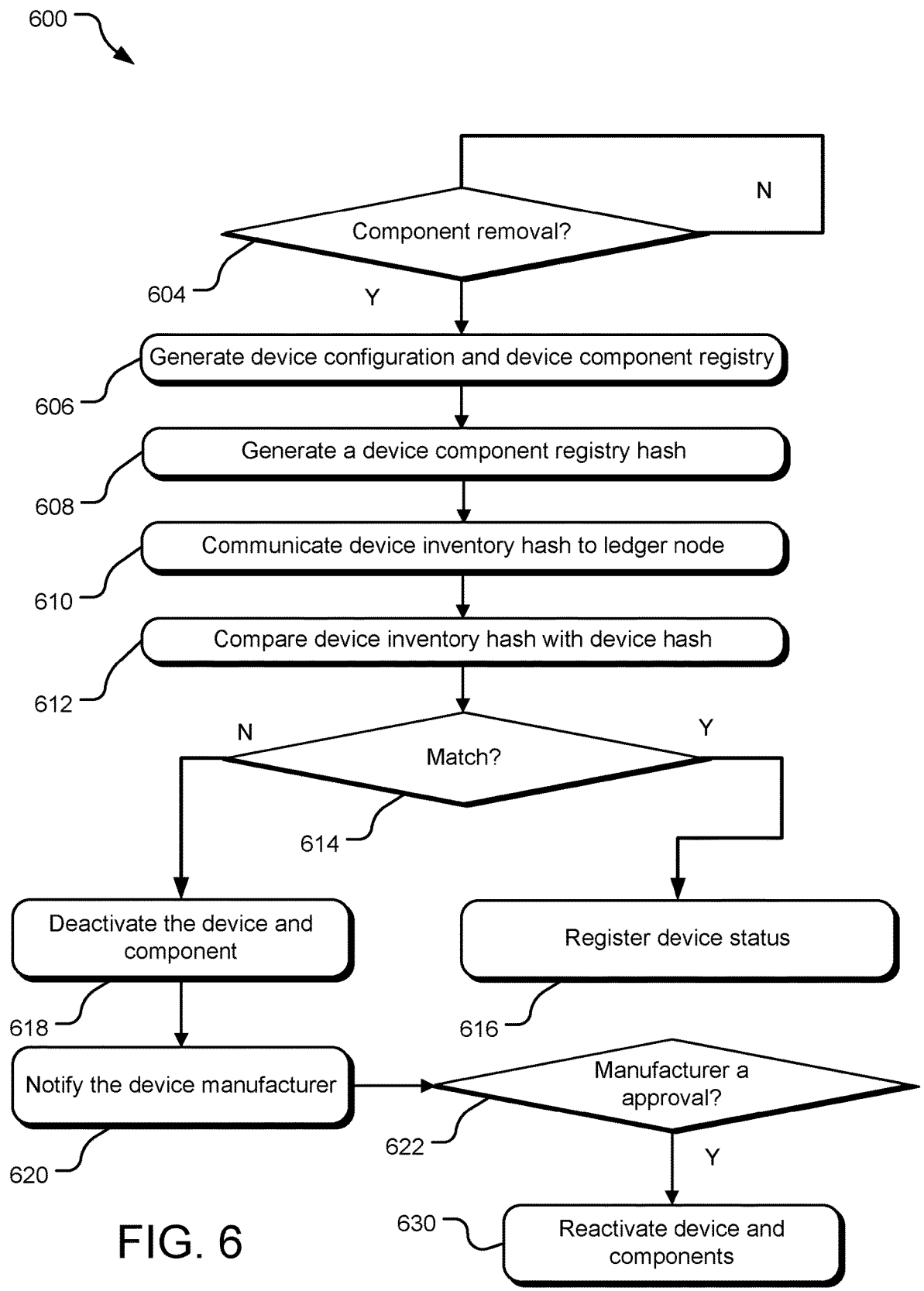
FIG. 6 illustrates yet another alternative example flowchart illustrating ensuring device configuration using a distributed ledger in response to removal of a component from the device.

FIG. 6 illustrates yet another alternative example flowchart 600 illustrating ensuring device configuration using a distributed ledger in response to removal of a component from the device. One or more of these operations may be implemented on the storage device. An operation 604 determines if any component has been removed. For example, any time there is any removal of a component, etc., a signal may be communicated to a module in the storage device to notify it of the component removal. In one implementation, the component removal detection may be a result of a periodic audit routine performed at the device. For example, on a periodic basis, an audit module of the storage device may perform an audit of the storage device components.

Alternatively, such audit may be performed each time the device is activated or when it is in an idle mode.

In response to determining that the storage device configuration may have changed, an operation 606 generates current device configuration and device component registry. An operation 508 generates a device component registry hash based on the current device configuration and device component registry. Subsequently, an operation 610 communicates the device component registry hash to a ledger node on a distributed ledger (such as the distributed ledger 102 disclosed in FIG. 1).

An operation 612 compares the device component registry hash with the device configuration hash. If there the device component registry hash matches the device configuration hash at a determining operation 614, an operation 616 registers the status of the device and the device may operate normally after that. If, the device component registry hash does not match the device configuration hash, an operation 618 deactivates the storage device and subsequently an operation 620 notifies the manufacturer of the device about the potential change in the device configuration and/or device components. In one implementation, an operation 622 determines if the device is to be allowed to operate in spite of the removal of the component. If so, an operation 630 reactivates the device for operation in its current state.

Figure 7:
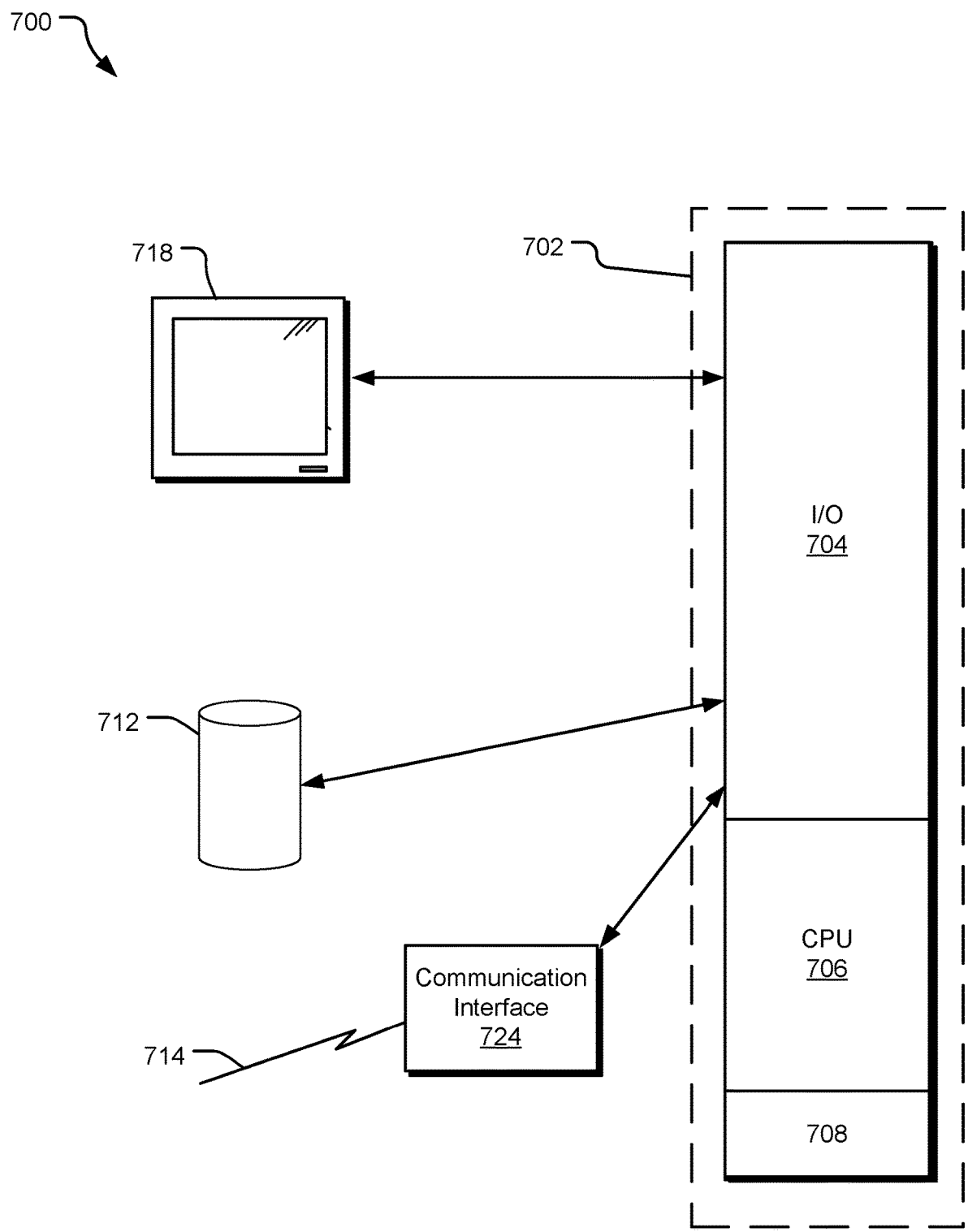
FIG. 7 illustrates an example processing system that may be useful in implementing the described technology.

FIG. 7 illustrates an example processing system 700 that may be useful in implementing the described technology. The processing system 700 is capable of executing a computer program product embodied in a tangible computer-readable storage medium to execute a computer process. Data and program files may be input to the processing system 700, which reads the files and executes the programs therein using one or more processors (CPUs or GPUs). Some of the elements of a processing system 700 are shown in FIG. 7 wherein a processor 702 is shown having an input/output (I/O) section 704, a Central Processing Unit (CPU) 706, and a memory section 708. There may be one or more processors 702, such that the processor 702 of the processing system 700 comprises a single central-processing unit 706, or a plurality of processing units. The processors may be single core or multi-core processors. The processing system 700 may be a conventional computer, a distributed computer, or any other type of computer. The described technology is optionally implemented in software loaded in memory 708, a storage unit 712, and/or communicated via a wired or wireless network link 714 on a carrier signal (e.g., Ethernet, 3G wireless, 8G wireless, LTE (Long Term Evolution)) thereby transforming the processing system 700 in FIG. 7 to a special purpose machine for implementing the described operations. The processing system 700 may be an application specific processing system configured for supporting a distributed ledger. In other words, the processing system 700 may be a ledger node.

The I/O section 704 may be connected to one or more user-interface devices (e.g., a keyboard, a touch-screen display unit 718, etc.) or a storage unit 712. Computer program products containing mechanisms to effectuate the systems and methods in accordance with the described technology may reside in the memory section 708 or on the storage unit 712 of such a system 700.

A communication interface 724 is capable of connecting the processing system 700 to an enterprise network via the network link 714, through which the computer system can receive instructions and data embodied in a carrier wave. When used in a local area networking (LAN) environment, the processing system 700 is connected (by wired connection or wirelessly) to a local network through the communication interface 724, which is one type of communications device. When used in a wide-area-networking (WAN) environment, the processing system 700 typically includes a modem, a network adapter, or any other type of communications device for establishing communications over the wide area network. In a networked environment, program modules depicted relative to the processing system 700 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 708 and/or the storage unit 712 and executed by the processor 702. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 708 and/or the storage unit 712 and executed by the processor 702.

The processing system 700 may be implemented in a device, such as a user device, storage device, IoT device, a desktop, laptop, computing device. The processing system 700 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   generating a device configuration distributed ledger block based on a hash of initial assembly of components of a storage device;
   storing the device configuration distributed ledger block on a node of a distributed ledger;
   detecting an activation of the storage device;
   in response to detecting the activation of the storage device, generating a current distributed ledger block based on a hash of current assembly of components of the storage device;
   comparing the current distributed ledger block with the device configuration distributed ledger block; and
   in response to determining that the current distributed ledger block does not match with the device configuration distributed ledger block, disabling the operation of the storage device.

2. The method of claim 1, wherein comparing the current distributed ledger block with the device configuration distributed ledger block further comprising comparing a device configuration hash based on initial assembly of components of the storage device with a current hash based on the current assembly of components of the storage device.

3. The method of claim 2, further comprising generating the device configuration hash based on configuration of the initial assembly of components of the storage device and initial component registry of the storage device.

4. The method of claim 2, further comprising generating the current hash based on current configuration of the assembly of components of the storage device and current component registry of the storage device.

5. The method of claim 1, further comprising storing the device configuration distributed ledger block on the storage device.

6. The method of claim 1, further comprising:
   in response to determining that the current distributed ledger block does not match with the device configuration distributed ledger block, initiating an audit of the device configuration.

7. The method of claim 1, further comprising:
   in response to determining that the current distributed ledger block does not match with the device configuration distributed ledger block, deactivating the device.

8. The method of claim 1 further comprising:
   detecting removal of a component of the storage device; and
   in response to detecting the removal of the component of the storage device generating a new current hash based on configuration and registry of the components of the storage device.

9. The method of claim 1, further comprising:
   performing an audit of the current configuration of components of the storage device in response to a predetermined event; and
   generating a current hash based on configuration and registry of the components of the storage device resulting from the audit.

10. The method of claim 9, wherein the predetermined event is an indication of grey market activity for a component of the storage device.

11. One or more processor-readable storage media encoding processor-executable instructions for executing on a computer system a computer process, the computer process comprising:
    generating a device configuration distributed ledger block based on a hash of initial assembly of components of a storage device;
    storing the device configuration distributed ledger block on a node of a distributed ledger;
    detecting an activation of the storage device;
    in response to detecting the activation of the device, generating a current distributed ledger block based on a hash of current assembly of components of the storage device;
    comparing the current distributed ledger block with the device configuration distributed ledger block; and
    in response to determining that the current distributed ledger block does not match with the device configuration distributed ledger block, disabling the operation of the device.

12. The one or more processor-readable storage media of claim 11 wherein comparing the current distributed ledger block with the device configuration distributed ledger block further comprising comparing a device configuration hash based on initial assembly of components of the storage device with a current hash based on the current assembly of components of the storage device.

13. The one or more processor-readable storage media of claim 12, wherein the computer process further comprising generating the current hash based on current configuration of the assembly of components of the storage device and current component registry of the storage device.

14. The one or more processor-readable storage media of claim 10, wherein the computer process further comprising generating the device configuration hash based on configuration of the initial assembly of components of the storage device and initial component registry of the storage device.

15. The one or more processor-readable storage media of claim 11, wherein the computer process further comprising storing the device configuration distributed ledger block on the storage device.

16. The one or more processor-readable storage media of claim 10, wherein the computer process further comprising:
in response to determining that the current distributed ledger block does not match with the device configuration distributed ledger block, deactivating the device.

17. The one or more processor-readable storage media of claim 10, wherein the computer process further comprising:
in response to determining that the current distributed ledger block does not match with the device configuration distributed ledger block, initiating an audit of the device provisioning.

18. A system comprising:
one or more processors;
a memory; and
a ledger node stored in the memory and executable by the one or more processors to support a distributed ledger, the ledger node configured to:
generate a device configuration ledger block based on initial assembly of components of a storage device;
store the device configuration ledger block on a node of a distributed ledger;
detect an activation of the device;
in response to detecting the activation of the device, generating a current distributed ledger block based on current assembly of components of the storage device; and
compare the current distributed ledger block with the device configuration ledger block; and
in response to determining that the current distributed ledger block does not match with the device configuration ledger block disable the operation of the device.

19. The system of claim 18 wherein the ledger node is further configured to compare the current distributed ledger block with the device configuration ledger block by comparing a master hash value based on initial assembly of components of a storage device with a current hash value based on the current assembly of components of a storage device.

20. The system of claim 18 wherein the ledger node is further configured to:
in response to determining that the current distributed ledger block does not match with the device configuration ledger block, initiating an audit of the device provisioning.

* * * * *